US012782223B2

(12) United States Patent
Russenes et al.

(10) Patent No.: US 12,782,223 B2
(45) Date of Patent: Nov. 3, 2026

(54) INTEGRATED MULTI MODAL EMISSION MEASUREMENTS LIFECYCLE

(71) Applicant: SCHLUMBERGER TECHNOLOGY CORPORATION, Sugar Land, TX (US)

(72) Inventors: Carsten Falck Russenes, Sandsli (NO); Francisco Gomez, Abingdon (GB); Marwa Abdelhamid, London (GB); Christopher Lunny, Menlo Park, CA (US); Andrew Speck, Cambridge, MA (US); Karl Staffan Tekin Eriksson, London (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 91 days.

(21) Appl. No.: 19/112,989

(22) PCT Filed: Sep. 19, 2023

(86) PCT No.: PCT/US2023/033106
§ 371 (c)(1),
(2) Date: Mar. 19, 2025

(87) PCT Pub. No.: WO2024/064113
PCT Pub. Date: Mar. 28, 2024

(65) Prior Publication Data

US 2026/0002828 A1 Jan. 1, 2026

Related U.S. Application Data

(60) Provisional application No. 63/376,130, filed on Sep. 19, 2022.

(51) Int. Cl.
*G01M 3/04* (2006.01)
*G06Q 30/018* (2023.01)

(52) U.S. Cl.
CPC ............ *G01M 3/04* (2013.01); *G06Q 30/018* (2013.01)

(58) Field of Classification Search
None
See application file for complete search history.

(56) References Cited

U.S. PATENT DOCUMENTS

| | | | | |
|---|---|---|---|---|
| 2020/0278741 | A1 * | 9/2020 | Madhusudhana | G06F 1/1694 |
| 2021/0156793 | A1 | 5/2021 | Leen | |

(Continued)

FOREIGN PATENT DOCUMENTS

| | | | |
|---|---|---|---|
| CN | 115018327 A | 9/2022 | |
| WO | 2022023226 A1 | 2/2022 | |

(Continued)

OTHER PUBLICATIONS

Y. Bao et al., "A Cloud-Based Information System of Emission Inventory Compilation for Digital Governance of Urban Air Pollution and Carbon Management," 2021 IEEE 7th International Conference on Control Sci. and Systems Engineering (ICCSSE), Qingdao, China, 2021, pp. 273-277, doi: 10.1109/ICCSSE5276 (Year: 2021).*

(Continued)

*Primary Examiner* — Laura Yesildag
(74) *Attorney, Agent, or Firm* — Kyle R. Miiller

(57) ABSTRACT

The disclosed methods and systems are directed to mitigating against one or more emissions events at a facility. The method comprises receiving first emissions data associated with the facility and formatting same based on a predefined data structure or a source type associated with the plurality of emissions sources of the facility. The method further comprises tracking using one or more sensors a plurality of emissions records generated using the emissions data. The data from the tracked emissions records may be used to (Continued)

generate an emissions inventory that may be used to generate one or more models which are used in one or more simulations to generate second emissions data. The second emissions data may enable tracking of one or more emissions sources associated with the facility. The second emissions data may enable execution of control operations that mitigate against one or more emissions sources associated with the facility.

19 Claims, 8 Drawing Sheets

(56) References Cited

U.S. PATENT DOCUMENTS

| | | | | |
|---|---|---|---|---|
| 2022/0205964 | A1* | 6/2022 | Conley | G01M 3/007 |
| 2022/0358606 | A1* | 11/2022 | Shi | G06N 3/0442 |
| 2023/0028260 | A1* | 1/2023 | Sanchez | G06Q 30/0241 |

FOREIGN PATENT DOCUMENTS

| | | | |
|---|---|---|---|
| WO | 2022051572 | A1 | 3/2022 |
| WO | 2022056152 | A1 | 3/2022 |

OTHER PUBLICATIONS

International Search Report and Written Opinion of International Patent Application No. PCT/US2023/033106 dated on Jan. 23, 2024, 07 pages.

* cited by examiner

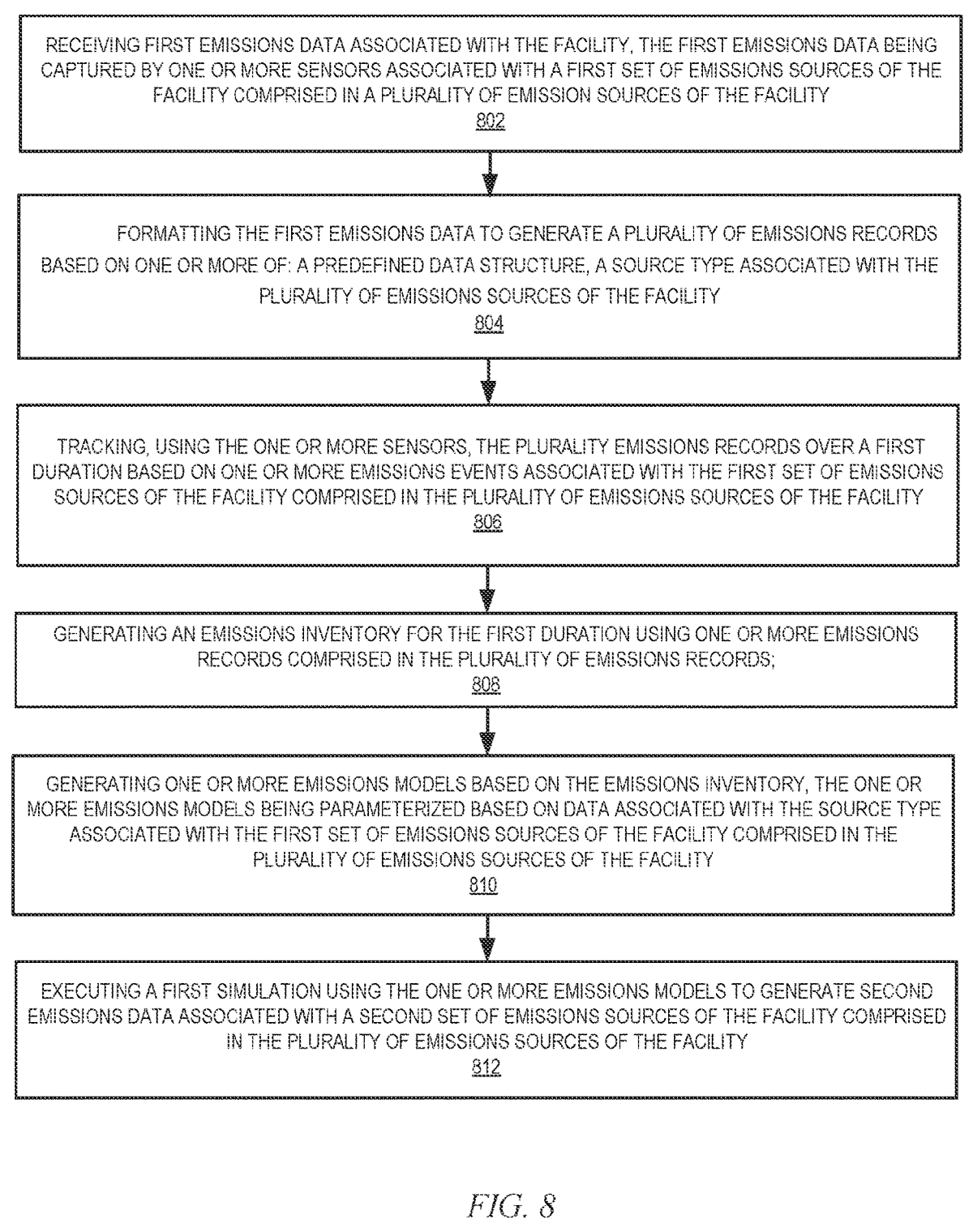

RECEIVING FIRST EMISSIONS DATA ASSOCIATED WITH THE FACILITY, THE FIRST EMISSIONS DATA BEING CAPTURED BY ONE OR MORE SENSORS ASSOCIATED WITH A FIRST SET OF EMISSIONS SOURCES OF THE FACILITY COMPRISED IN A PLURALITY OF EMISSION SOURCES OF THE FACILITY
802

FORMATTING THE FIRST EMISSIONS DATA TO GENERATE A PLURALITY OF EMISSIONS RECORDS BASED ON ONE OR MORE OF: A PREDEFINED DATA STRUCTURE, A SOURCE TYPE ASSOCIATED WITH THE PLURALITY OF EMISSIONS SOURCES OF THE FACILITY
804

TRACKING, USING THE ONE OR MORE SENSORS, THE PLURALITY EMISSIONS RECORDS OVER A FIRST DURATION BASED ON ONE OR MORE EMISSIONS EVENTS ASSOCIATED WITH THE FIRST SET OF EMISSIONS SOURCES OF THE FACILITY COMPRISED IN THE PLURALITY OF EMISSIONS SOURCES OF THE FACILITY
806

GENERATING AN EMISSIONS INVENTORY FOR THE FIRST DURATION USING ONE OR MORE EMISSIONS RECORDS COMPRISED IN THE PLURALITY OF EMISSIONS RECORDS;
808

GENERATING ONE OR MORE EMISSIONS MODELS BASED ON THE EMISSIONS INVENTORY, THE ONE OR MORE EMISSIONS MODELS BEING PARAMETERIZED BASED ON DATA ASSOCIATED WITH THE SOURCE TYPE ASSOCIATED WITH THE FIRST SET OF EMISSIONS SOURCES OF THE FACILITY COMPRISED IN THE PLURALITY OF EMISSIONS SOURCES OF THE FACILITY
810

EXECUTING A FIRST SIMULATION USING THE ONE OR MORE EMISSIONS MODELS TO GENERATE SECOND EMISSIONS DATA ASSOCIATED WITH A SECOND SET OF EMISSIONS SOURCES OF THE FACILITY COMPRISED IN THE PLURALITY OF EMISSIONS SOURCES OF THE FACILITY
812

*FIG. 8*

INTEGRATED MULTI MODAL EMISSION MEASUREMENTS LIFECYCLE

CROSS-REFERENCE TO RELATED APPLICATIONS

This application is the National Stage Entry of International Application No. PCT/US2023/033106, filed Sep. 19, 2023, which claims priority to U.S. Provisional Patent App. No. 63/376,130, filed Sep. 19, 2022, and entitled "Integrated Multi Modal Emission Measurements Lifecycle," which is incorporated herein by reference in its entirety for all purposes.

BACKGROUND

In today's oil and gas industry there is an increased push by regulators, consumers, activists, and companies to act responsibly on the threat of global warming and climate change. One of the key challenges to achieve viable emissions reduction (e.g., Methane emissions reduction) is to understand how, where and what one's facility, equipment, and/or processes are emitting at a spatio-temporal scale that not only captures major events (e.g., flare events, vent events, blow-out events, etc.) but also reflects the diffuse intermittent and periodic emissions (leak events, etc.).

SUMMARY

The embodiments described herein include methods, systems, and computer programs for detecting and/or mitigating against emissions associated with a facility or a resource site. According to one embodiment, the disclosed methods include: receiving first emissions data associated with the facility, the first emissions data being captured by one or more sensors associated with a first set of emissions sources of the facility comprised in a plurality of emissions sources of the facility; and formatting the first emissions data to generate a plurality of emissions records based on one or more of: a predefined data structure, and a source type associated with the plurality of emissions sources of the facility. The methods further include: tracking, using the one or more sensors, the plurality of emissions records over a first duration based on one or more emissions events associated with the first set of emissions sources of the facility comprised in the plurality of emissions sources of the facility; generating an emissions inventory for the first duration using one or more emissions records comprised in the plurality of emissions records; generating one or more emissions models based on the emissions inventory, the one or more emissions models being parameterized based on data associated with the source type associated with the first set of emissions sources of the facility comprised in the plurality of emissions sources of the facility; and executing a first simulation using the one or more emissions models to generate second emissions data associated with a second set of emissions sources of the facility comprised in the plurality of emissions sources of the facility.

In another embodiment, a system and a computer program can include or execute the method described above. These and other implementations may each optionally include one or more of the following features. The second emissions data may be used to generate one or more visualizations that is displayed on graphical user interface. In addition, the second emissions data may be used to automatically generate and transmit emissions reports to a regulatory body. According to some embodiments, the second emissions data may be used to generate a space-time emissions map associated with the facility. In addition, the second emissions data may be used to execute one or more control operations including one or more of: initiating equipment configurations that mitigate against at least one emissions event at the facility; initiating triggering or configuring an alert system associated with at least one emissions event at the facility; and configuring a sensitivity setting of at least one sensor system associated with at least one emissions event at the facility.

According to some embodiments, the predefined structure discussed above comprises a data structure that facilitates parameterization of the one or more emissions records using space-time variables associated with the facility. In addition, the second set of emissions sources does not have sensors that capture the first emissions data, such that emissions tracking or management of the second set of emissions sources is based on the second emissions data. According to one embodiment, the one or more sensors comprise one or more of: Lidar emissions sensors; camera emissions sensors; sniffer sensors, drone sensors; or satellite sensors.

In some instances, the signal processing engine may be further used to execute a validation operation that correlates the second emissions data with the first emissions data to generate optimization parameters for the one or more emissions models. The optimization parameters, for example, may be used to parameterize the one or more emissions models during execution of a second simulation using the one or more emissions models. Moreover, the one or more emissions events can comprise one or more of intended leak events and unintended leak events associated with the facility.

In some implementations, the second emissions data comprises an emissions timeline for the one or more emissions events. Furthermore, the second emissions data can comprise indicators including: frequency data associated with the one or more emissions events; time duration data associated with the one or more emissions events; or time of occurrence data associated with the one or more emissions events.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion.

FIG. 8 provides an exemplary workflow for methods, systems, and computer programs for detecting and/or mitigating against emissions associated with a facility or a resource site.

DETAILED DESCRIPTION

Figure 1:
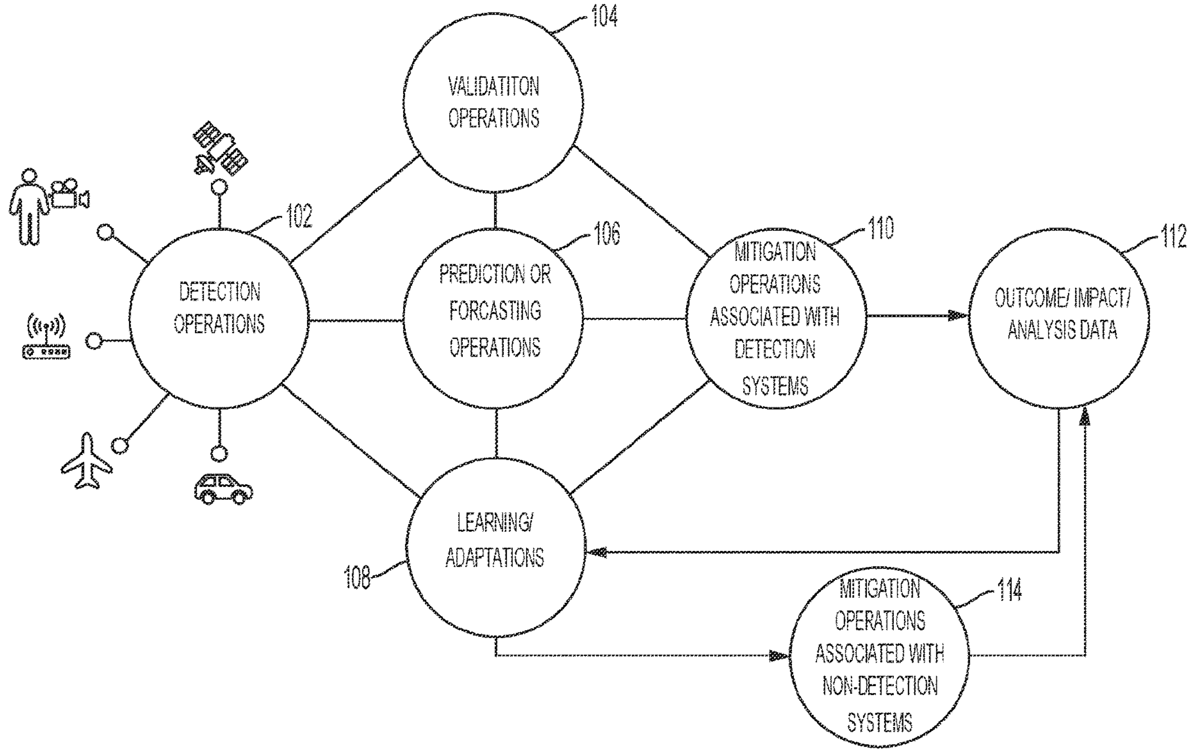
FIG. 1 shows an exemplary workflow for determining emissions data.

Reference will now be made in detail to embodiments, examples of which are illustrated in the accompanying drawings and figures. In the following detailed description, numerous specific details are set forth in order to provide a thorough understanding of this disclosure. However, it will be apparent to one of ordinary skill in the art that the disclosed technology may be practiced without these specific details. In other instances, well-known methods, procedures, components, circuits and networks have not been described in detail so as not to unnecessarily obscure aspects of the embodiments.

The disclosed systems and methods may be accomplished using interconnected devices and systems that obtain a plurality of data associated with various parameters of interest at a resource site. The workflows/flowcharts described in this disclosure, according to some embodiments, implicate a new processing approach (e.g., hardware, special purpose processors, and specially programmed general-purpose processors) because such analyses are too complex and cannot be done by a person in the time available or at all. Thus, the described systems and methods are directed to tangible implementations or solutions to specific technological problems in exploring natural resources such as oil, gas, water well industries, and other mineral exploration operations. More specifically, the systems and methods presently disclosed may be applicable to exploring resources such as oil, natural gas, water, and Salar brines.

Attention is now directed to methods, techniques, infrastructure, and workflows for operations that may be carried out at a resource site. Some operations in the processing procedures, methods, techniques, and workflows disclosed herein may be combined while the order of some operations may be changed. Some embodiments include an iterative refinement of one or more data associated with the resource site via feedback loops executed by one or more computing device processors and/or through other control devices/mechanisms that make determinations regarding whether a given action, template, or resource data, etc., is sufficiently accurate.

Emissions from facilities may be estimated based on production numbers, emissions factors, and annual inspection operations using tools such as optical gas imagers (OGI). With the growing focus of efficiently reducing emissions, there is a need for capturing and analyzing emissions data to generate high fidelity result sets that can be used to mitigate against emissions. A major challenge in achieving this includes handling or integrating a myriad of data from different emissions sources (e.g., data from actual measurements and/or data from estimations and/or simulations) as well as different data formats associated with the emissions data thereby making such data very segmented and up to the end user to interpret. As part of the analysis of the emissions data, certain considerations need to be made. These considerations include: where the specific emissions events are occurring; how large the emissions events are; which facilities and/or equipment have associated emissions events; how critical are the emissions events; what are the causes and/or triggers for the emissions events; how best can said emissions events be estimated; and what optimal ways are available for mitigating and/or addressing said emissions.

The present disclosure is directed to efficiently reducing emissions associated with oil and gas facilities. In one embodiment, the systems and methods disclosed allow: real-time estimation of emissions; rapid analysis of said real-time estimations; and automatically generating mitigation strategies to address detected emissions. According to one embodiment, the disclosed technology enables tracking of emissions activity, leveraging relevant data associated with the emissions activity, and providing a consistent spatial-temporal view visualization comprising data indicative of one or more of an emissions map, emissions timeline, and an emissions inventory (e.g., equipment associated with the emissions) to manage and efficiently reduce emissions for a given facility. For example, FIG. 1 provides an exemplary workflow for detecting emissions events and/or automatically initiating the execution of one or more mitigation actions against detected emissions. At stage 102, one or more emissions detection equipment may be used to detect an emissions event. As further discussed below, the one or more emissions detection equipment may complement, validate, or confirm detected emissions data from each other according to some embodiments. At stage 104, the detected emissions data may be analyzed and/or validated prior to being subjected to a forecasting operation and/or a simulation operation at stage 106. At stage 110, output data (e.g., emissions map and/or an emissions inventory for detected emissions data, or configuration data) resulting from executing the forecasting and/or simulation operations may be used to implement mitigation operations against one or more emissions sources having an associated emissions monitoring and/or emissions management system. Furthermore, the detected emissions data may be used to augment and/or enhance at stage 108 an emissions model developed for, and/or associated with the sources from which the emissions data was detected. As can be seen from the crisscross interconnections of FIG. 1, it is appreciated that data from multiple stages can be fedback and/or used as inputs to other stages to facilitate system improvements and thereby optimize emissions detection and mitigation activities. For example, outcome or impact data (e.g., see stage 112) associated with generating and/or implementing emissions mitigation strategies from stage 110 may be fedback to the emissions model at stage 108. The emissions model, according to one embodiment can also be fed data from the detection stage 102 as well as data from the simulation or forecasting stage 106 such that the additional data received at stage 108 can be correlated with previous emissions detections and/or previous emissions detections mitigation strategies to optimize the emissions model. This optimized emissions model may be used to, for example, manage and/or control emissions events and/or execute emissions mitigation operations, at stage 114, associated with non-detection emissions systems that are disparately located relative to a location of the emissions detection systems of stage 102.

In some embodiments, a signal processing engine including a machine learning engine may use the emissions data associated with the facility to generate one or more emissions models (e.g., emissions digital twin(s)) which can be used to estimate or otherwise predict future emissions from a given source and automatically generate remediation operations that can be used to prevent re-occurring future emissions from said source. In one embodiment, the generated model is statistically parameterized to characterize emissions properties associated with assets (e.g., facilities, resource sites, etc.) that have one or more emissions sources.

According to one embodiment, the signal processing engine may define a workflow for tracking data indicating the life cycle of an emissions event(s) associated with a facility, from inception to detection up to mitigation/repair. At each stage of the life cycle of the emissions event, the signal processing engine may learn from data associated with each event comprised in the life cycle emissions event and based on this, train an emissions model (e.g., a digital twin model) which may be subsequently used for predicting future emissions data.

Each input to the workflow for tracking data indicating the life cycle of one or more emissions events may be consumed by the signal processing engine from a data layer comprising data from sensor measurements, analysis data derived from calculations associated with the emissions, estimated data derived using statistical and/or stochastic techniques on emissions data, simulated data associated with emissions, manually inputted data, emissions maintenance data, or emissions mitigation data. In one embodiment, each emissions event may be subsequently linked with asset information using a translation layer associated with the emissions event(s) in the form of a "record" that indexes multiple different data sources and supports dynamic and variable resolution depending on data available in a specific region. In one embodiment, the translation layer formats emissions data from a plurality of sources to have similar data structures that allow for spatial and/or temporal mapping of the emissions data structures (e.g., equipment or assets) associated with the emissions of a given facility. For example, the translation layer may translate properties or parameters associated with an emissions model (e.g., emissions digital twin) to available asset information of the facility. In some cases, the translation layer may be enhanced by a data component of the signal processing engine that increases mapping accuracy by considering the temporal nature of the available emissions data, neighboring equipment relative to an asset being considered, and historical operational trends (e.g., emissions trends) of the asset being considered. Furthermore, an attribution quality which is a property used to qualitatively and/or quantitatively characterize a level of confidence or accuracy associated with correctly determining and associating a detected emissions event with a structure (e.g., an equipment/asset having an emissions source) of the facility may be determined based on the emissions model and/or emissions data. In some cases, the signal processing engine may leverage the attribution quality in combination with the resolution of the emissions model to generate a spatial and/or temporal emissions mapping which can be used to further optimize the prediction and classification capacity of the emissions model (e.g., the emissions digital twin).

Resource Site

Figure 2:
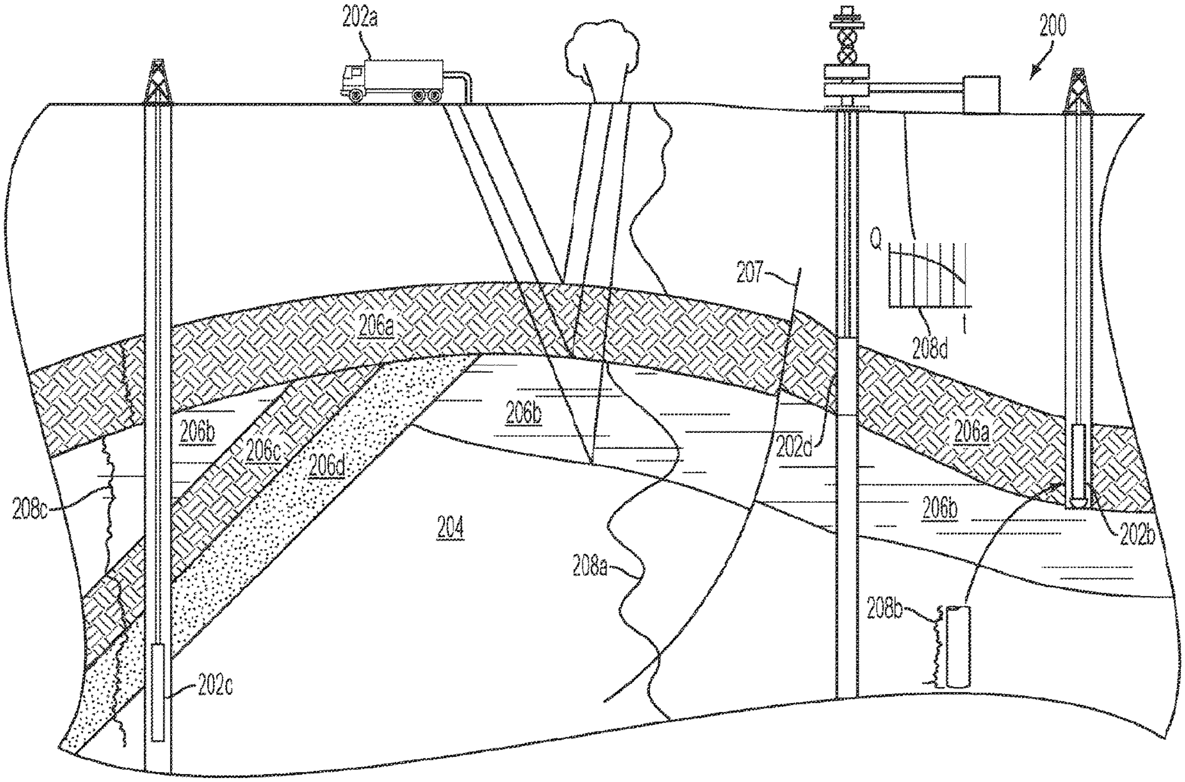
FIG. 2 shows a cross-sectional view of a resource site for which the process of FIG. 1 may be executed.

FIG. 2 shows a cross-sectional view of a resource site 200 which may include or be associated with one or more facilities for which emissions events may be tracked and/or mitigated against. While the illustrated resource site 200 represents a subterranean formation, the resource site, according to some embodiments, may be below water bodies such as oceans, seas, lakes, ponds, wetlands, rivers, etc. According to one embodiment, various measurement tools capable of sensing one or more parameters such as seismic two-way travel time, density, resistivity, production rate, etc., of a subterranean formation and/or geological formations may be provided at the resource site. As an example, wireline tools may be used to obtain measurement information related to geological attributes (e.g., geological attributes of a wellbore and/or reservoir) including geophysical and/or geochemical information associated with the resource site 200. In some embodiments, various sensors may be located at various locations around the resource site 200 to monitor and collect data for executing the process of FIG. 1.

Part, or all, of the resource site 200 may be on land, on water, or below water. In addition, while a resource site 200 is depicted, the technology described herein may be used with any combination of one or more resource sites (e.g., multiple oil fields or multiple wellsites, etc.), one or more processing facilities, etc. As can be seen in FIG. 2, the resource site 200 may have data acquisition tools 202*a*, 202*b*, 202*c*, and 202*d* positioned at various locations within the resource site 200. The subterranean structure 204 may have a plurality of geological formations 206*a*-206*d*. As shown, this structure may have several formations or layers, including a shale layer 206*a*, a carbonate layer 206*b*, a shale layer 206*c*, and a sand layer 206*d*. A fault 207 may extend through the shale layer 206*a* and the carbonate layer 206*b*. The data acquisition tools, for example, may be adapted to take measurements and detect geophysical and/or geochemical characteristics of the various formations shown.

While a specific subterranean formation with specific geological structures is depicted, it is appreciated that the oil field 200 may contain a variety of geological structures and/or formations, sometimes having extreme complexity. In some locations of a given geological structure, for example below a water line relative to the given geological structure, fluid may occupy pore spaces of the formations. Each of the measurement devices may be used to measure properties of the formations and/or other geological features. While each data acquisition tool is shown as being in specific locations in FIG. 2, it is appreciated that one or more types of measurement may be taken at one or more locations across one or more sources of the resource site 200 or other locations for comparison and/or analysis. The data collected from various sources at the resource site 200 may be processed and/or evaluated and/or used as training data, and or used to generate high resolution result sets for characterizing a resource at the resource site, and/or used for generating resource models, etc.

Data acquisition tool 202*a* is illustrated as a measurement truck, which may comprise devices or sensors that take measurements of the subsurface through sound vibrations such as, but not limited to, seismic measurements. Drilling tool 202*b* may include a downhole sensor adapted to perform logging while drilling (LWD) data collection. Wireline tool 202*c* may include a downhole sensor deployed in a wellbore or borehole. Production tool 202*d* may be deployed from a production unit or Christmas tree into a completed wellbore. Examples of parameters that may be measured include weight on bit, torque on bit, subterranean pressures (e.g., underground fluid pressure), temperatures, flow rates, compositions, rotary speed, particle count, voltages, currents, and/or other parameters of operations as further discussed below.

Sensors may be positioned about the oil field 200 to collect data relating to various oil field operations, such as sensors deployed by the data acquisition tools 202. The sensor may include any type of sensor such as a metrology sensor (e.g., temperature, humidity), an automation enabling sensor, an operational sensor (e.g., pressure sensor, $H_2S$ sensor, thermometer, depth, tension), evaluation sensors, that can be used for acquiring data regarding the formation, wellbore, formation fluid/gas, wellbore fluid, gas/oil/water comprised in the formation/wellbore fluid, or any other suitable sensor. For example, the sensors may include accelerometers, flow rate sensors, pressure transducers, electromagnetic sensors, acoustic sensors, temperature sensors, chemical agent detection sensors, nuclear sensor, and/or any additional suitable sensors. In one embodiment, the data captured by the one or more sensors may be used to characterize, or otherwise generate one or more parameter values for a high resolution result set used to, for example, generate a resource model. In other embodiments, test data or synthetic data may also be used in developing the resource model via one or more simulations such as those discussed in association with the flowcharts presented herein.

Evaluation sensors may be featured in downhole tools such as tools 202*b*-202*d* and may include for instance electromagnetic, acoustic, nuclear, and optic sensors. Examples of tools including evaluation sensors that can be used in the framework of the current method include electromagnetic tools including imaging sensors such as FMI™ or QuantaGeo™ (mark of Schlumberger); induction sensors such as Rt Scanner™ (mark of Schlumberger), multifrequency dielectric dispersion sensor such as Dielectric Scanner™ (mark of Schlumberger); acoustic tools including sonic sensors, such as Sonic Scanner™ (mark of Schlumberger) or ultrasonic sensors, such as pulse-echo sensor as in UBI™ or PowerEcho™ (marks of Schlumberger) or flexural sensors PowerFlex™ (mark of Schlumberger); nuclear sensors such as Litho Scanner™ (mark of Schlumberger) or nuclear magnetic resonance sensors; fluid sampling tools including fluid analysis sensors such as InSitu Fluid Analyzer™ (mark of Schlumberger); distributed sensors including fiber optic. Such evaluation sensors may be used in particular for evaluating the formation in which the well is formed (i.e., determining petrophysical or geological properties of the formation), for verifying the integrity of the well (such as casing or cement properties) and/or analyzing the produced fluid (flow, type of fluid, etc.).

As shown, data acquisition tools 202*a*-202*d* may generate data plots or measurements 208*a*-208*d*, respectively. These data plots are depicted within the resource site 200 to demonstrate that data generated by some of the operations executed at the resource site 200.

Data plots 208*a*-208*c* are examples of static data plots that may be generated by data acquisition tools 202*a*-202*c*, respectively. However, it is herein contemplated that data plots 208*a*-208*c* may also be data plots that may be generated and updated in real time. These measurements may be analyzed to better define properties of the formation(s) and/or determine the accuracy of the measurements and/or check for and compensate for measurement errors. The plots of each of the respective measurements may be aligned and/or scaled for comparison and verification purposes. In some embodiments, base data associated with the plots may be incorporated into site planning, modeling a test at the resource site 200. The respective measurements that can be taken may be any of the above.

Other data may also be collected, such as historical data of the resource site 200 and/or sites similar to the resource site 200, user inputs, information (e.g., economic information) associated with the resource site 200 and/or sites similar to the resource site 200, and/or other measurement data and other parameters of interest. Similar measurements may also be used to measure changes in formation aspects over time.

Figure 3:
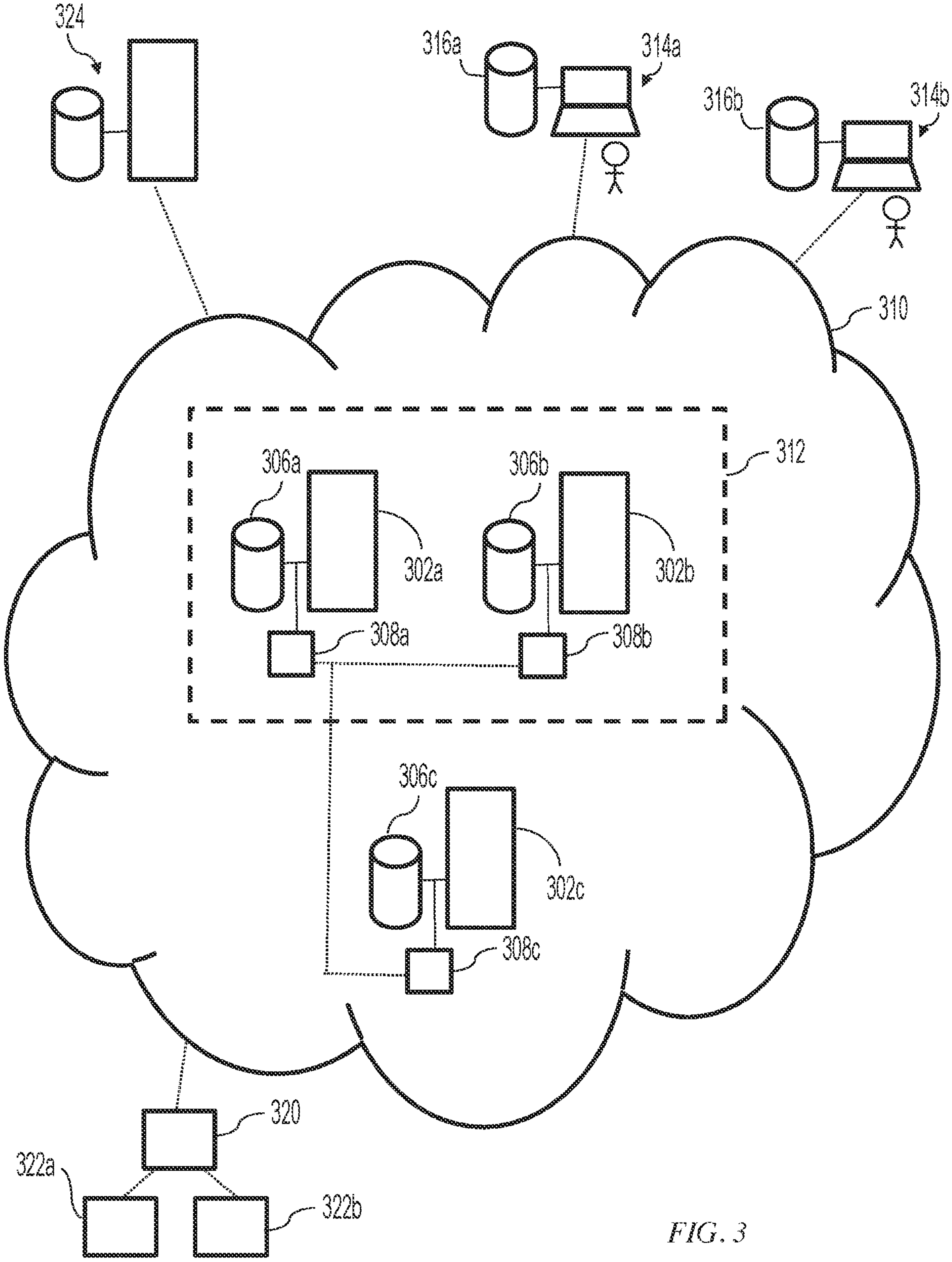
FIG. 3 shows a high-level networked system illustrating a communicative coupling of devices or systems associated with the resource site of FIG. 2.

Computer facilities such as those discussed in association with FIG. 3 may be positioned at various locations about the resource site 200 (e.g., a surface unit) and/or at remote locations. A surface unit (e.g., one or more terminals 320) may be used to communicate with the onsite tools and/or offsite operations, as well as with other surface or downhole sensors. The surface unit may be capable of sending commands to the oil field equipment/systems, and receiving data therefrom. The surface unit may also collect data generated during production operations and can produce output data, which may be stored or transmitted for further processing.

The data collected by sensors may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis or for modeling purposes to optimize production processes at the oil field 200. In one embodiment, the data is stored in separate databases, or combined into a single database.

High-Level Networked System

FIG. 3 shows a high-level networked system diagram illustrating a communicative coupling of devices or systems associated with the resource site 200. The system shown in the figure may include a set of processors 302*a*, 302*b*, and 302*c* for executing one or more processes discussed herein. The set of processors 302 may be electrically coupled to one or more servers (e.g., computing systems) including memory 306*a*, 306*b*, and 306*c* that may store for example, program data, databases, and other forms of data. Each server of the one or more servers may also include one or more communication devices 308*a*, 308*b*, and 308*c*. The set of servers may provide a cloud-computing platform 310. In one embodiment, the set of servers includes different computing devices that are situated in different locations and may be scalable based on the needs and workflows associated with the oil field 200. The communication devices of each server may enable the servers to communicate with each other through a local or global network such as an Internet network. In some embodiments, the servers may be arranged as a town 312, which may provide a private or local cloud service for users. A town may be advantageous in remote locations with poor connectivity. Additionally, a town may be beneficial in scenarios with large networks where security may be of concern. A town in such large network embodiments can facilitate implementation of a private network within such large networks. The town may interface with other towns or a larger cloud network, which may also communicate over public communication links. Note that cloud-computing platform 310 may include a private network and/or portions of public networks. In some cases, a cloud-computing platform 310 may include remote storage and/or other application processing capabilities.

The system of FIG. 3 may also include one or more user terminals 314*a* and 314*b* each including at least a processor to execute programs, a memory (e.g., 316*a* and 316*b*) for storing data, a communication device and one or more user interfaces and devices that enable the user to receive, view, and transmit information. In one embodiment, the user terminals 314*a* and 314*b* is a computing system having interfaces and devices including keyboards, touchscreens, display screens, speakers, microphones, a mouse, styluses, etc. The user terminals 314 may be communicatively coupled to the one or more servers of the cloud-computing platform 310. The user terminals 314 may be client terminals or expert terminals, enabling collaboration between clients and experts through the system of FIG. 3.

The system of FIG. 3 may also include at least one or more oil fields 200 having, for example, a set of terminals 320, each including at least a processor, a memory, and a communication device for communicating with other devices communicatively coupled to the cloud-computing platform 310. The resource site 200 may also have one or more sensors (e.g., one or more sensors described in association with FIG. 2) or sensor interfaces 322*a* and 322*b* communicatively coupled to the set of terminals 320 and/or directly coupled to the cloud-computing platform 310. In some embodiments, data collected by the one or more sensors/sensor interfaces 322*a* and 322*b* may be processed to generate one or more resource models or one or more resolved data sets used to generate the resource model which may be displayed on a user interface associated with the set of terminals 320, and/or displayed on user interfaces associated with the set of servers of the cloud computing platform 310, and/or displayed on user interfaces of the user terminals 314. Furthermore, various equipment/devices discussed in association with the resource site 200 may also be communicatively coupled to the set of terminals 320 and/or communicatively coupled directly to the cloud-computing platform 310. The equipment and sensors may also include one or more communication device(s) that may communicate with the set of terminals 320 to receive orders/instructions locally and/or remotely from the resource site 200 and also send statuses/updates to other terminals such as the user terminals 314.

The system of FIG. 3 may also include one or more client servers 324 including a processor, memory and communication device. For communication purposes, the client servers 324 may be communicatively coupled to the cloud-computing platform 310, and/or to the user terminals 314*a* and 314*b*, and/or to the set of terminals 320 at the resource site 200 and/or to sensors at the oil field, and/or to other equipment at the resource site 200.

A processor, as discussed with reference to the system of FIG. 3, may include a microprocessor, a graphical processing unit (GPU), a microcontroller, a processor module or subsystem, a programmable integrated circuit, a programmable gate array, or another control or computing device.

The memory/storage media discussed above in association with FIG. 3 can be implemented as one or more computer-readable or machine-readable storage media that are non-transitory. In some embodiments, storage media may be distributed within and/or across multiple internal and/or external enclosures of a computing system and/or additional computing systems. Storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that instructions can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). The storage medium or media can be located either in a computer system running the machine-readable instructions, or located at a remote site from which machine-readable instructions can be downloaded over a network for execution.

It is appreciated that the described system of FIG. 3 is an example that may have more or fewer components than shown, may combine additional components, and/or may have a different configuration or arrangement of the components. The various components shown may be implemented in hardware, software, or a combination of both, hardware and software, including one or more signal processing and/or application specific integrated circuits.

Further, the steps in the flowcharts described below may be implemented by running one or more functional modules in an information processing apparatus such as general-purpose processors or application specific chips, such as ASICs, FPGAs, PLDs, GPUs, or other appropriate devices associated with the system of FIG. 3. For example, the flowchart of FIG. 1 as well as the flowcharts below may be executed using a signal processing engine stored in memory 306*a*, 306*b*, or 306*c* such that the signal processing engine includes instructions that are executed by the one or more processors such as processors 302*a*, 302*b*, or 302*c* as the case may be. The various modules of FIG. 3, combinations of these modules, and/or their combination with general hardware are included within the scope of protection of the disclosure. While one or more computing processors (e.g., processors 302*a*, 302*b*, or 302*c*) may be described as executing steps associated with one or more of the flowcharts described in this disclosure, the one or more computing device processors may be associated with the cloud-based computing platform 310 and may be located at one location or distributed across multiple locations. In one embodiment, the one or more computing device processors may also be associated with other systems of FIG. 3 other than the cloud-computing platform 310.

In some embodiments, a computing system is provided that includes at least one processor, at least one memory, and one or more programs stored in the at least one memory, such that the programs comprise instructions, which when executed by the at least one processor, are configured to perform any method disclosed herein.

In some embodiments, a computer readable storage medium is provided, which has stored therein one or more programs, the one or more programs including instructions, which when executed by a processor, cause the processor to perform any method disclosed herein. In some embodiments, a computing system is provided that includes at least one processor, at least one memory, and one or more programs stored in the at least one memory for performing any method disclosed herein. In some embodiments, an information processing apparatus for use in a computing system is provided for performing any method disclosed herein.

EMBODIMENTS

The disclosed technology provides an efficient approach for managing emissions from multi-modal data sources and improves emissions data visibility, provides optimal decision workflows for the emissions data, and enables continuously (real-time or near real-time emissions detections) detecting or identifying emissions events (e.g., emissions due to intended or unintended leaks (e.g., flares, vents, blow-outs, etc.)), executing mitigation operations to reduce the detected emissions events, and accurately classifying (quantitatively and/or qualitatively) emissions data being captured by one or more sensors associated with one or more assets. In addition, the presented methods and systems facilitate determining time parameters/indicators (e.g., frequency of emissions event(s), time duration associated with emissions event(s), time of occurrence of emission(s) events, etc.) associated with a group of observations and generates specific emissions indicators for improved sampling and reporting of emissions data. Defining a sampling strategy and computing source specific emissions factors based on an emissions framework (e.g., Oil and Gas Methane Partnership (OGMP) protocol levels 4 (L4) or 5 (L5), etc.) may also be automatically generated by one or more systems disclosed for regulatory compliance purposes. In some embodiments, the term optimal and its variants (e.g., efficient, optimally, etc.) may simply indicate improving, rather than the ultimate form of 'perfection' or the like.

According to one embodiment, the methods and systems disclosed enable unifying emissions data from a plurality of sources and generating one or more spatial and/or temporal visualizations (e.g., spatio-temporal visualizations) of the unified emissions data. In some cases, the visualized unified data may be associated with or otherwise linked with one or more physical equipment to facilitate accounting and root cause analysis operations. This beneficially allows a user to appreciate emissions sources associated with a given facility, emissions behavior associated with said facility, and recommended mitigation operations associated with minimizing and/or eliminating one or more emissions associated with said facility.

In some embodiments, the disclosed methods and systems assist operators to focus efforts in attributing specific emissions events to corresponding equipment/machines within a given facility, classifying said emissions events (e.g. classifying emissions events as having a vent property, fugitive property, or a false positive property), and quantifying (e.g., ascribing a quantitative leak rate amount in kg/hr) to said emissions events. Moreover, the disclosed technology may assist in compiling and maintaining an emissions inventory that enables computational tools such as OGMP 2.0 L4 to reconcile and/or compare with an OGMP L5 site level measurements. Furthermore, the disclosed technology may assist in determining an actual top-down (using captured data from one or more emissions measurements from satellites, drone or aerial sensors, ground-level sensors, production sensors, etc.) spatial and temporal coverage of emissions data to generate or improve an emissions model. In addition, the disclosed methods and systems may facilitate automatically determining a severity level of a leak event contributing to emissions associated with a facility and automatically providing or recommending mitigation operations for said leak event. Another benefit provided by the disclosed technology is that it provides an auditable record of measurements associated with emissions from a specific asset (e.g., equipment, etc.). The disclosed methods and systems can also determine when an observation associated with an emissions event has qualitative properties and/or quantitative amounts that can be used to inform a source specific emissions characterization (e.g., an emissions model) used for an improved reporting and sampling strategy. The disclosed approach, in some embodiments, allows: linking emissions data associated with a facility with productions data associated with said facility; correlating emissions data to historical emissions data of said facility for specific emissions sources of said facility; and generating an emissions factor (EF) for each emissions source. This can then be applied across locations with similar source types for an organization (e.g., one or more facilities associated with a given entity) to comply with regulatory standards and reporting frameworks (e.g., OGMP L4).

In some embodiments, the disclosed techniques and systems provide a processing layer between measurements and asset definitions that facilitate automated operations as previously discussed. Another advantage provided by this disclosure is that it eliminates manual operations of aggregating emissions data from a plurality of sources which is infeasible for facilities having a plurality (e.g., thousands) of emissions sources with corresponding data that need to be captured and dynamically associated with one or more assets corresponding to the emissions sources. This improves traceability and facilitates more accurate real-time or near real-time reporting of emissions events. Another benefit provided by this disclosure includes efficiently managing the whole lifecycle of emissions associated with one or more facilities from inception, detection to repair/mitigation. In particular, the processes disclosed allow for more accurate and automated computing operations that identify emissions sources and provide insights associated with the emissions factors for said emissions sources. Thus, the methods and systems disclosed can allow users to reduce emissions (e.g., gas emissions such as methane emissions) continuously and effectively by: combining various acquired emissions data captured by one or more sensors (e.g., Lidar emissions sensors, camera emissions sensors, sniffer sensors, drones, satellite sensors, or other sensors discussed in association with the resource site discussed above); and generating comprehensive analysis data that provide insights into the emissions data including emissions behavior or properties from the emissions sources as well as detection effectiveness by the one or more sensors used to capture the emissions data.

Multi-stage processing workflow(s) (see FIGS. 4-7) may be used by one or more systems disclosed. In particular, these figures are directed to: tracking the lifecycle of an emissions event(s) associated with an emissions record; maintaining an inventory of emissions statements; training or operating an emissions model (e.g., an emissions twin) of each source type; and reconciling a top-down with a bottom-up prediction on a given site. In some embodiments, the emissions record may comprise a data structure that is associated with an emissions event such that the emissions event is supported or characterized by a plurality of different evidence-based observations (e.g., using different sensors to detect the same emissions event or using the same sensor to detect and validate the same emissions event).

Figure 4:
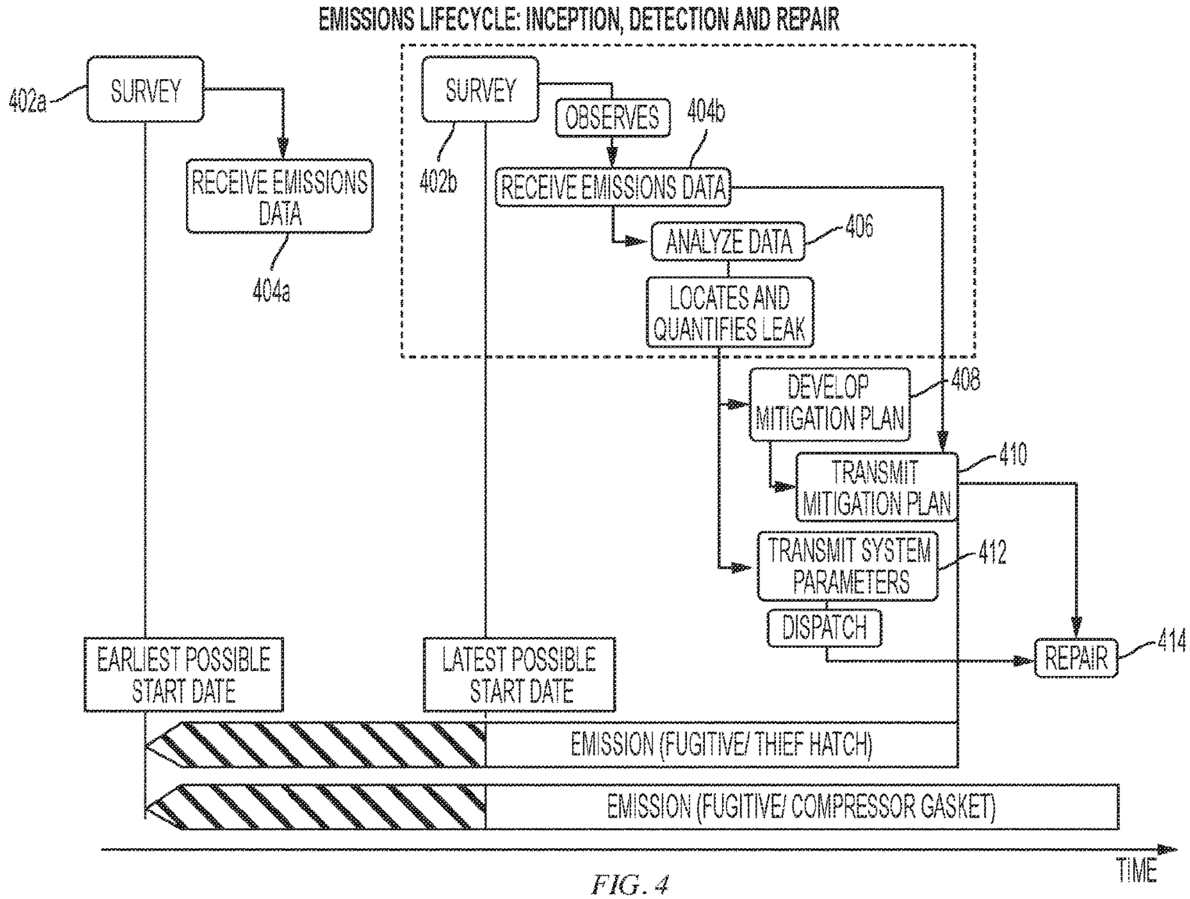
FIGS. 4-7 show exemplary flowcharts for tracking emissions events and generating emissions data according to some embodiments.

FIG. 4, for example, provides a stage-wise progression of operations associated with an emissions lifecycle, according to some embodiments. For example, the operations include detecting at block 402 (e.g., 402*a* and 402*b*) one or more emissions data from a plurality of sources. At block 404 (e.g., 404*a* and 404*b*), the processes involve receiving the one or more emissions data and analyzing same at block 406. According to one embodiment, the analysis of the one or more emissions data facilitates the detection or location of one or more emissions events (e.g., leak events) and the quantitatively or qualitatively characterize same within a data file or a data report that indicates a characterized emissions data. At block 408, the characterized emissions data may be used to generate a mitigation plan which may then be transmitted, at block 410, for execution of mitigation operations at block 414. According to some embodiments, the characterized emissions data may also be transmitted, at block 412, to parameterize an emissions model that can drive emissions management and/or mitigation processes at block 414.

Figure 5:
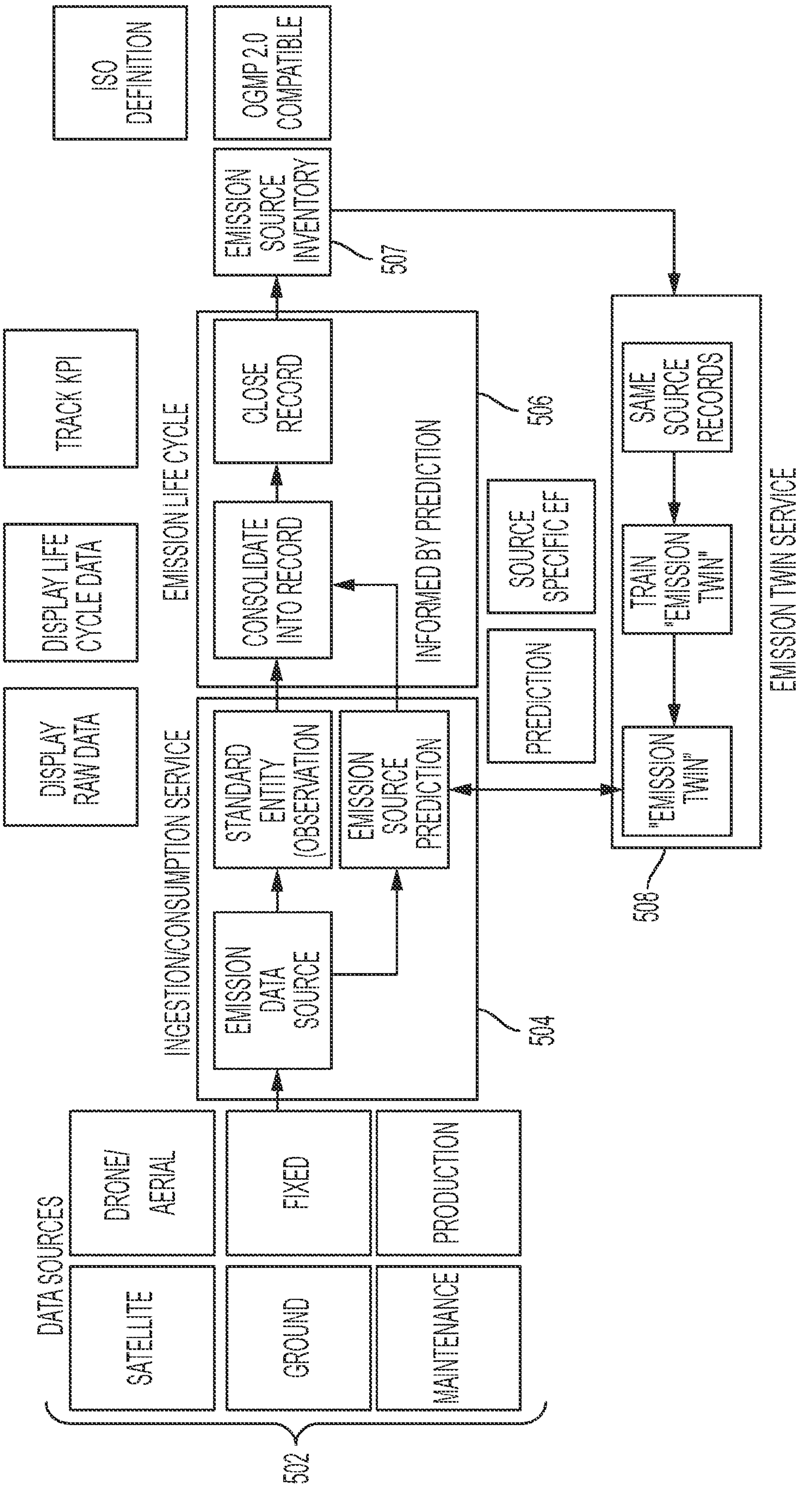

FIG. 5 shows an exemplary multi-stage processing workflow for emissions detection and management. At block 504, emissions data may be ingested or otherwise captured from a plurality of data sources 502. The plurality of data sources may include emissions detection sensors comprised in a satellite, ground-based detection systems, maintenance facility sensors, production facility sensors, sensors fixed within resource sites, etc. At block 506, the emissions data may be subjected to a set of preprocessing operations include consolidating the formatted emissions data into spatio-temporal (e.g., space-time) emissions records. At block 507, an emissions inventory (e.g., an emissions source inventory) may be generated to enable computational tools to reconcile and/or compare and/or analyze emissions data based on emissions models and/or historical emissions data. In one embodiment, the emissions inventory and or other emissions data may be used to generate one or more emissions models (e.g., an emissions twin) that mimic and/or correspond to emissions behavior of the one or more emissions sources (e.g., data sources 502).

Figure 6:
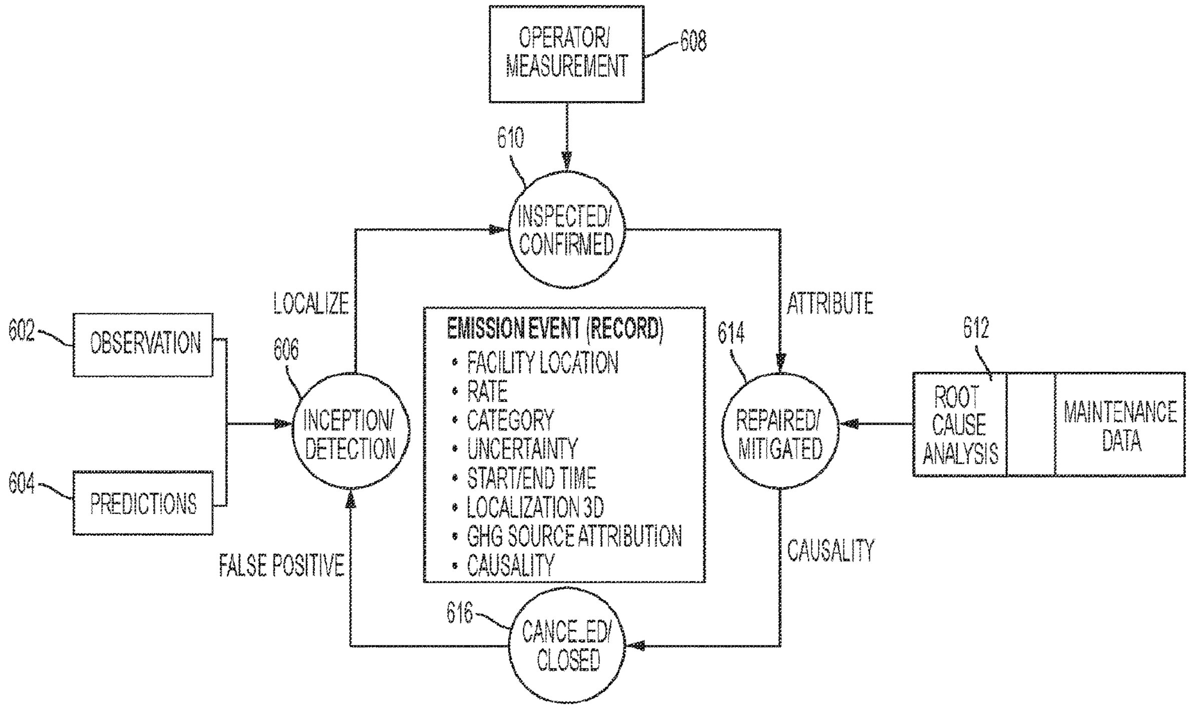

FIG. 6 shows an exemplary workflow for enhancing an emissions model. According to one embodiment, an emissions model generated using, for example, an emissions inventory may be tested (e.g., simulated) and/or observed at block 602 and/or used to generate forecast or analysis data at block 604 based on the testing at block 602. The analysis data generated from block 602 and 604 may be received at stage 606 and confirmed using emissions measurements (e.g., emissions data) 608 at stage 610 from one or more emissions sources. According to one embodiment, attribute data characterizing one or more properties of the validated emissions data may be used in conjunction with equipment and/or maintenance data 612 of emissions equipment to configure and/or initiate emissions mitigation strategies, at block 614, for a given emissions record. At block 616, the emissions operations associated with the emissions record may be closed following which the impacts of the emissions operations is fedback to stage 606 to enhance, improve, or validate the emissions model at stage 606.

Figure 7:
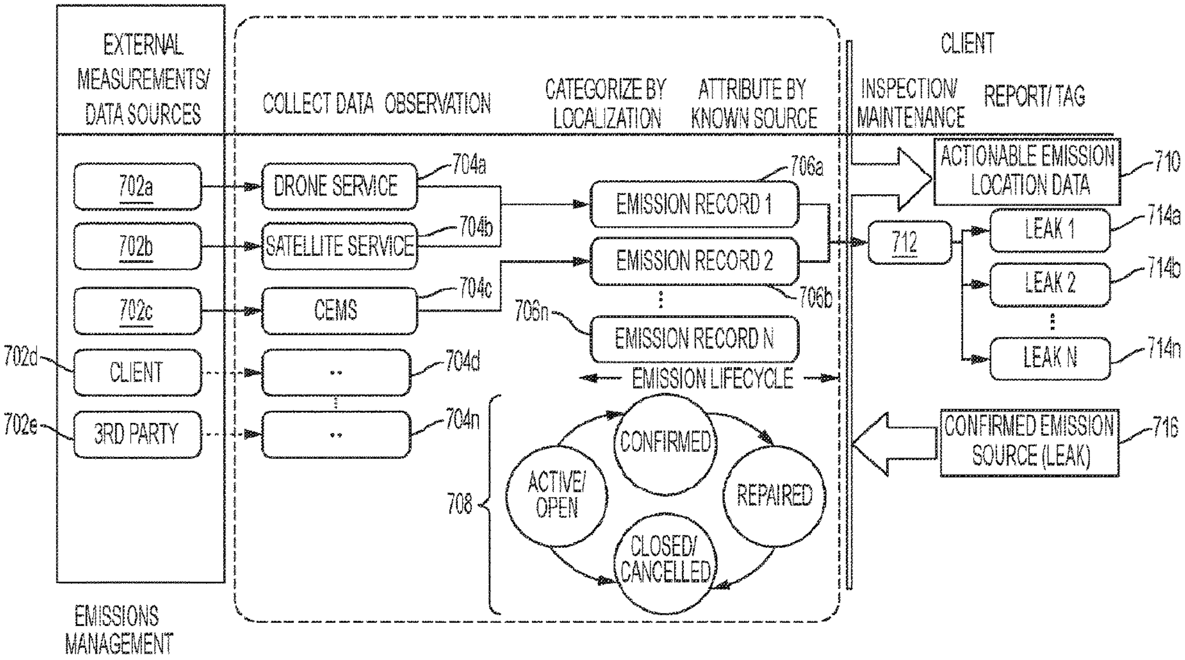

FIG. 7 provides an exemplary workflow for using multiple emissions records for emissions event management associated with an emissions model. One or more emissions data sources 702*a* . . . 702*e* (e.g., emissions detection sensors) coupled to one or more monitoring systems 704*a* . . . 704*n* may provide emissions data used to generate a plurality of emissions records 706*a* . . . 706*n*. It is appreciated that the emissions records 706*a* . . . 706*n* may be associated with an emissions model. According to one embodiment, the various processing stages 708 associated with each emissions record comprises: an open stage where the emissions record is created and activated for analysis and/or execution in one or more simulations or tests; a validation or confirmation stage that can incorporate and/or use real-time or near real-time sensor data to confirm or validate an emissions record to generate mitigation strategies; a mitigation testing or simulation stage where maintenance or emissions mitigation strategies are implemented (e.g., computationally implemented) based on the validated emissions record; and a deactivation stage where the emissions record is deactivated or otherwise closed in response to determining or arriving at a mitigation impact threshold (e.g., impact data) based on the mitigation strategies. According to one embodiment, the impact data may be used, at blocks 710 and 712 to initiate a plurality of emissions control or maintenance operations such as configuring a plurality of systems and thereby control, for example, emissions leak events 714*a* . . . 714*n*. According to one embodiment, confirmation data of the effectiveness of one or more mitigation strategies may be transmitted, at block 716, to refine an emissions model associated with the plurality of emissions records 706*a* . . . 706*n*.

FIG. 8 provides an exemplary workflow for methods, systems, and computer programs for detecting and/or mitigating against emissions associated with a facility or a resource site. It is appreciated that a signal processing engine stored in a memory device may cause a computer processor to execute the various processing stages of FIG. 8. For example, the disclosed techniques may be implemented as a signal processing engine within a facility monitoring software tool such that the signal processing engine enables the implementation of detecting and/or initiating mitigation processes of emissions events.

At block 802, the signal processing engine may receive first emissions data associated with the facility. The first emissions data can be captured by one or more sensors associated with a first set of emissions sources of the facility such that the first set of emissions sources are comprised in a plurality of emission sources associated with the facility. At block 804, the signal processing engine may format, the first emissions data to generate a plurality of emissions records based on one or more of: a predefined data structure; and a source type associated with the plurality of emissions sources of the facility. The signal processing engine may further track, at block 806, using the one or more sensors, the plurality emissions records over a first duration based on one or more emissions events associated with the first set of emissions sources of the facility comprised in the plurality of emissions sources of the facility. At block 808, the signal processing engine may generate an emissions inventory for the first duration using one or more emissions records comprised in the plurality of emissions records. In addition, the signal processing engine may be used to generate, at block 810, one or more emissions models based on the emissions inventory, the one or more emissions models being parameterized based on data associated with the source type associated with the first set of emissions sources of the facility comprised in the plurality of emissions sources of the facility. At block 812, the signal processing engine may be used to execute a first simulation using the one or more emissions models to generate second emissions data associated with a second set of emissions sources of the facility comprised in the plurality of emissions sources of the facility.

In another embodiment, a system and a computer program can include or execute the method described above. These and other implementations may each optionally include one or more of the following features. The second emissions data may be used to generate one or more visualizations that is displayed on graphical user interface. In addition, the second emissions data may be used to automatically generate and transmit emissions reports to a regulatory body. According to some embodiments, the second emissions data may be used to generate a space-time emissions map associated with the facility. In addition, the second emissions data may be used to execute one or more control operations including one or more of: initiating equipment configurations that mitigate against at least one emissions event at the facility; initiating, triggering, or configuring an alert system associated with at least one emissions event at the facility; and configuring a sensitivity setting of at least one sensor system associated with at least one emissions event at the facility.

According to some embodiments, the predefined structure discussed in association with block 804 of FIG. 8 comprises a data structure that facilitates parameterization of the one or more emissions records using space-time variables associated with the facility. In addition, the second set of emissions sources does not have sensors that capture the first emissions data, such that emissions tracking or management of the second set of emissions sources is based on the second emissions data. According to one embodiment, the one or more sensors comprise one or more of: LiDAR emissions sensors; camera emissions sensors; sniffer sensors; drone sensors; or satellite sensors.

In some instances, the signal processing engine may be further used to execute a validation operation that correlates the second emissions data with the first emissions data to generate optimization parameters for the one or more emissions models. The optimization parameters, for example, may be used to parameterize the one or more emissions models during execution of a second simulation using the one or more emissions models. Moreover, the one or more emissions events can comprise one or more of intended leak events and unintended leak events associated with the facility.

In some implementations, the second emissions data comprises an emissions timeline for the one or more emissions events. Furthermore, the second emissions data can comprise indicators including: frequency data associated with the one or more emissions events; time duration data associated with the one or more emissions events; or time of occurrence data associated with the one or more emissions events.

It is appreciated that the disclosed techniques facilitate the use of emissions models to confirm or otherwise validate emissions data associated with emissions monitoring systems and thereby refine or enhance the tracing or identification of sources associated with said emissions events (e.g. leaks). For example, emissions data generated by testing one or more emissions models can be correlated or combined with detected emissions data from one or more emissions sensors. Based on the correlation and/or combination, the emissions model for a given facility or resource site may be enhanced for utilization in, for example, a site or facility that is similar to the site associated with the enhanced emissions model. According to one embodiment, meteorological data may be combined with the emissions model (e.g., a forward emissions model) to simulate methane plume behavior and thereby ensure accuracy and/or efficacy of the disclosed method for detecting emissions events and/or mitigating against the emissions events.

Ingesting or Consuming Emissions Data

A data consumption service may be configured for each different emissions data source that can range from programmatic ingestion and seamless integration to manual consumption. The consumed data may be organized based on certain protocols and/or standards and/or frameworks (e.g., ISO 14000 family and OpenFootprint). The consumed data may also be classified based on data source type into an emissions entity object that indicates observation data associated with specific emissions events. This observation data may include attributes such as time data, source data, quantitative and/or qualitative emissions values data, uncertainty data, etc., and may be persisted for auditability.

Consolidating Spatio-Temporal Emissions Entities into Emissions Records

Tracking the lifecycle of an emissions event(s) may comprise using emissions records that may be cross-referenced with production operations, and other relevant data for the location of emissions sources for a given time period. All observations (first and subsequent observations related to a given emissions source) may be automatically consolidated into one or more emissions record(s) by a service that executes a spatial and/or temporal analysis using uncertainty data (e.g., spatial uncertainty data, stochastic/probabilistic uncertainty distribution data) as well as existing inventory sources.

The one or more emissions records, according to one embodiment, comprises a spatial and/or a temporal reference to relevant data for a specific emissions event, and continuously updated as new relevant data is ingested (e.g., from sensors associated with the emissions sources). The purpose of the one or more emissions records, in some implementations, is to: localize (e.g., spatially localize) a source of a given emissions event; accurately attribute, map, or link said localized source or location to an established emissions inventory (e.g., an emissions inventory associated with OGMP or ISO emissions sources); qualitatively and/or quantitatively classify the nature of the given emissions event (e.g., leak, vent or false positive, or ascribing weights to the emissions events); and compute, for example, a total amount (e.g., in mass, weight, or volume) of the emissions based on the emissions event over the period of the emissions event.

Tracking the Lifecycle of an Emissions Event(s)

The life cycle of each emissions event may be tracked from inception to mitigation, and closed out and confirmed by an operator input and/or by an analytic tool. In particular, one or more computing inputs may drive the tracking, mitigation, and closure of an emissions event. Furthermore, each emissions record may be persisted through time, spatially tagged (e.g., the record has spatial indicators), and displayed in both a spatial and temporal context for visibility thereby giving users the ability to view and understand spatial and temporal aspects of one or more emissions events and whether there are any “blind-spots” or locations associated with a facility or a resource site that are not being covered by emissions monitoring and/or mitigation systems. These records together with user inputs (such as on the ground confirmation with higher resolution measurements and subsequent repair action) may be used to inform current or subsequent inference operations (e.g., using an emissions model) associated with effectively detecting and/or managing emissions events.

In the case of a supplied user input, the disclosed system enables an application of procedural advice contextually tailored to ensure adherence to applicable standards of managing emissions events. Such inputs, for example, may include commands or rule sets for generating analysis data (e.g., emissions volumes, emissions masses, emissions area of spread, etc.) associated with emissions events.

Maintaining an Inventory of Emissions Statements

The outcome of each confirmed or closed emissions record may be saved as part of an emissions inventory for one or more emissions events. The emissions record may also be updated and/or maintained as an auditable “source of truth” document or file with full traceability for each emissions source for each location (e.g., asset/facility/site) and associated computational input/decisions for full auditability and procedural audit operations. In some embodiments, the emissions record is compatible with reporting formats such as formats associated with OGMP. Each emissions record may inform the calculation of source specific emissions factors, which may be essential in, for example, OGMP L4 reporting.

Training or Operating an Emissions Model (e.g., an Emissions Twin) of Each Source Type Using Confirmed Records of Same Source Type, Location, and/or Distribution For each of the emissions records comprising data (e.g., emissions source type, emissions inventory list, etc.) associated with emissions events, a model (e.g., a digital twin model) may be automatically generated and trained based on emissions record(s) and/or observations from sensor data captured from one or more emissions sources. Each of the emissions models may be subsequently connected to or linked to specific emissions sources and may be used to predict/inform new emissions records associated with the emissions sources in a continuous learning cycle to assist in an improved understanding of each source's emissions profile for better, more precise mitigation efforts. Also, the continuous improvement of source specific emissions factors using the emissions model may include comparing predicted source specific emissions records to actual observations in a statistical or stochastic manner so as to use new observations to optimize the emissions model.

Reconciling a Top-Down With A Bottom-Up Prediction on a Given Site

For each created emissions record associated with a given site, a comparison operation may be executed where the total emissions predicted from the sum of emissions records (e.g., emissions records for each individual component combined using simulated predictions for said components) are compared with emissions data captured by one or more sensors associated with one or more of the emissions sources. Any discrepancies detected may be fed back into the model parameters of the emissions model to improve the emissions model as well as to update the source specific emissions factors. This quality control measure facilitates correlating outputs (e.g., emissions data predictions) by the emissions model with actual data being captured by one or more sensors associated with emissions sources corresponding to assets within a facility.

According to some embodiments, the emissions model may be used to track emissions data of a second set of assets comprised in a plurality of assets (e.g., assets having similar properties (e.g., similar asset types)) associated with the facility using one or more emissions models generated using sensor data from a first set of assets comprised in the plurality of assets associated with the facility. This may provide tremendous cost savings related to purchasing, installing, and maintaining emissions sensors for all the assets comprised in the plurality of assets associated with the facility. The tracking data generated from the one or more emissions model may indicate emissions predictions associated with the plurality of assets. In some cases, the tracking data may be used to initiate control operations that mitigate against emissions associated with one or more assets comprised in the plurality of assets associated with the facility. Furthermore, the tracking data generated by the one or more emissions models may be used to automatically generate and transmit emissions reports to regulatory bodies. In some embodiments, the tracking data generated by the one or more emissions models may be used to generate a spatio-temporal (e.g., space-time) emissions map that is displayed on a graphical user interface to visually characterize emissions behavior in a given facility such that the emissions map includes an emissions profile for each emissions source associated with the facility.

These systems, methods, processing procedures, techniques, and workflows increase effectiveness and efficiency in emissions detection and management. Such systems, methods, processing procedures, techniques, and workflows may complement or replace conventional methods for identifying, isolating, transforming, and/or processing various aspects of data that is collected from a subsurface region or other multi-dimensional space to enhance flow simulation prediction accuracy.

While any discussion of or citation to related art in this disclosure may or may not include some prior art references, Applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the disclosed technology to the precise forms disclosed. Many modifications and variations are possible in view of the above teachings. The embodiments were chosen and described in order to explain the principles of the disclosed subject-matter and its practical applications, to thereby enable others skilled in the art to use this disclosure and various embodiments with various modifications as are suited to the particular use contemplated.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the disclosed subject-matter. The first object or step, and the second object or step, are both objects or steps, respectively, but they are not to be considered the same object or step.

The terminology used in the description herein is for the purpose of describing particular embodiments and is not intended to be limiting. As used in the description of this disclosure and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for mitigating against emissions associated with a facility, the method comprising:

receiving, using a computer processor, first emissions data associated with the facility, the first emissions data being captured by one or more sensors associated with a first set of emissions sources of the facility comprised in a plurality of emissions sources of the facility, the first set of emissions sources comprising a first emissions source and a second emissions source different than the first emissions source;

formatting, using the computer processor, the first emissions data to generate a plurality of emissions records based on at least one of:

a predefined data structure; or a source type associated with the plurality of emissions sources of the facility;

tracking, using the computer processor and the one or more sensors, the plurality of emissions records over a first duration based on a plurality of emissions events associated with the first set of emissions sources of the facility comprised in the plurality of emissions sources of the facility;

linking a first emissions event of the plurality of emissions events with first data of the first emissions data related to a first operation of the first emissions source;

linking a second emissions event of the plurality of emissions events with second data of the first emissions data related to a second operation of the second emissions source;

generating, using the computer processor, an emissions inventory for the first duration using one or more emissions records comprised in the plurality of emissions records;

generating, using the computer processor, an emissions model based on the emissions inventory, the emissions model comprising a digital twin of the first emissions source, the emissions model being parameterized based on data associated with the source type associated with the first set of emissions sources of the facility comprised in the plurality of emissions sources of the facility, the emissions model comprising a translation layer configured to:

translate parameters associated with the emissions model to the first data and the second data; and format the first data and the second data to have similar data structures that allow for spatial and temporal mapping of the first emissions source and the second emissions source;

increasing an accuracy of the digital twin by enhancing the translation layer through an inclusion of a temporal nature of the first emissions data, neighboring equipment relative to the first emissions source, and historical operational trends of the first emissions source, wherein the neighboring equipment comprises the second emissions source;

optimizing a prediction and classification capacity of the digital twin using an attribution quality in combination with a resolution of the digital twin to generate a spatial and temporal emissions mapping, the attribution quality comprising a property used to qualitatively and quantitatively characterize a level of confidence associated with correctly determining the first emissions event and associating the first emissions event with the first emissions source;

generating a space-time emissions map of the facility based on the spatial and temporal emissions mapping;

executing, using the computer processor and based on the space-time emissions map of the facility, a first simulation using the emissions model to generate second emissions data associated with a second set of emissions sources of the facility comprised in the plurality of emissions sources of the facility;

closing the first operation of the first emissions source in response to the first simulation;

feeding impact information from the closing of the first operation to the emissions model to generate an improved emissions model; and executing a mitigation operation of the first emissions source in real time based on the improved emissions model.

2. The method of claim 1, wherein the second emissions data is used to generate one or more visualizations that are displayed on graphical user interface.

3. The method of claim 1, wherein the second emissions data is used to automatically generate and transmit emissions reports to a regulatory body.

4. The method of claim 1, wherein the second emissions data is used to:

execute one or more control operations including at least one of:

initiating equipment configurations that mitigate against at least one emissions event of the plurality of emissions events at the facility;

initiating, triggering, or configuring an alert system associated with at least one emissions event of the plurality of emissions events at the facility; or configuring a sensitivity setting of at least one sensor system associated with at least one emissions event of the plurality of emissions events at the facility.

5. The method of claim 1, wherein the predefined data structure comprises a data structure that facilitates parameterization of the one or more emissions records using space-time variables associated with the facility.

6. The method of claim 1, wherein the second set of emissions sources does not have sensors that capture the first emissions data, such that emissions tracking or management of the second set of emissions sources is based on the second emissions data.

7. The method of claim 1, wherein the one or more sensors comprise at least one of:

LiDAR emissions sensors;

camera emissions sensors;

sniffer sensors;

drone sensors; or satellite sensors.

8. The method of claim 1, further comprising executing, using the computer processor, a validation operation that correlates the second emissions data with the first emissions data to generate optimization parameters for the emissions model.

9. The method of claim 8, wherein the optimization parameters are used to parameterize the emissions model during execution of a second simulation using the emissions model.

10. The method of claim 1, wherein the plurality of emissions events comprise one or more of intended leak events or unintended leak events associated with the facility.

11. The method of claim 1, wherein the second emissions data comprises an emissions timeline for the plurality of emissions events.

12. The method of claim 1, wherein the second emissions data comprises indicators including at least one of:

frequency data associated with the plurality of emissions events;

time duration data associated with the plurality of emissions events; or time of occurrence data associated with the plurality of emissions events.

13. The method of claim 1, further comprising optimizing the improved emissions model by comparing emissions records predicted by the improved emissions model and specific to the first emissions source to actual observations of the first emissions source in a statistical or stochastic manner.

14. A system for mitigating against emissions associated with a facility, the system comprising:

a computer processor, and memory storing instructions that are executable by the computer processor to:

receive first emissions data associated with the facility, the first emissions data being captured by one or more sensors associated with a first set of emissions sources of the facility comprised in a plurality of emissions sources of the facility, the first set of emissions sources comprising a first emissions source and a second emissions source different than the first emissions source;

format the first emissions data to generate a plurality of emissions records based on at least one of:

a predefined data structure; or a source type associated with the plurality of emissions sources of the facility;

track using the one or more sensors, the plurality of emissions records over a first duration based on a plurality of emissions events associated with the first set of emissions sources of the facility comprised in the plurality of emissions sources of the facility;

link a first emissions event of the plurality of emissions events with first data of the first emissions data related to a first operation of the first emissions source;

link a second emissions event of the plurality of emissions events with second data of the first emissions data related to a second operation of the second emissions source;

generate an emissions inventory for the first duration using one or more emissions records comprised in the plurality of emissions records;

generate an emissions model based on the emissions inventory, the emissions model comprising a digital twin of the first emissions source, the emissions model being parameterized based on data associated with the source type associated with the first set of emissions sources of the facility comprised in the plurality of emissions sources of the facility, the emissions model comprising a translation layer configured to:

translate parameters associated with the emissions model to the first data and the second data; and format the first data and the second data to have similar data structures that allow for spatial and temporal mapping of the first emissions source and the second emissions source;

increase an accuracy of the digital twin by enhancing the translation layer through an inclusion of a temporal nature of the first emissions data, neighboring equipment relative to the first emissions source, and historical operational trends of the first emissions source, wherein the neighboring equipment comprises the second emissions source;

optimize a prediction and classification capacity of the digital twin using an attribution quality in combination with a resolution of the digital twin to generate a spatial and temporal emissions mapping, the attribution quality comprising a property used to qualitatively and quantitatively characterize a level of confidence associated with correctly determining the first emissions event and associating the first emissions event with the first emissions source;

generate a space-time emissions map of the facility based on the spatial and temporal emissions mapping;

execute, based on the space-time emissions map of the facility, a first simulation using the emissions model to generate second emissions data associated with a second set of emissions sources of the facility comprised in the plurality of emissions sources of the facility;

close the first operation of the first emissions source in response to the first simulation;

feed impact information from the closing of the first operation to the emissions model to generate an improved emissions model; and execute a mitigation operation of the first emissions source in real time based on the improved emissions model.

15. The system of claim 14, wherein the predefined data structure comprises a data structure that facilitates parameterization of the one or more emissions records using space-time variables associated with the facility.

16. The system of claim 14, wherein the second set of emissions sources does not have sensors that capture the first emissions data, such that emissions tracking of the second set of emissions sources is based on the first emissions data.

17. The system of claim 14, wherein the one or more sensors comprise at least one of:

LiDAR emissions sensors;

camera emissions sensors;

sniffer sensors;

drone sensors; or satellite sensors.

18. A computing device comprising a processor and a memory component storing executable instructions that, when executed by the processor, cause the computing device to:

receive first emissions data associated with a facility, the first emissions data being captured by one or more sensors associated with a first set of emissions sources of the facility comprised in a plurality of emissions sources of the facility, the first set of emissions sources comprising a first emissions source and a second emissions source different than the first emissions source;

format the first emissions data to generate a plurality of emissions records based on at least one of:

a predefined data structure; or a source type associated with the plurality of emissions sources of the facility;

track using the one or more sensors, the plurality of emissions records over a first duration based on a plurality of emissions events associated with the first set of emissions sources of the facility comprised in the plurality of emissions sources of the facility;

link a first emissions event of the plurality of emissions events with first data of the first emissions data related to a first operation of the first emissions source;

link a second emissions event of the plurality of emissions events with second data of the first emissions data related to a second operation of the second emissions source;

generate an emissions inventory for the first duration using one or more emissions records comprised in the plurality of emissions records;

generate an emissions model based on the emissions inventory, the emissions model comprising a digital twin of the first emissions source, the emissions model being parameterized based on data associated with the source type associated with the first set of emissions sources of the facility comprised in the plurality of emissions sources of the facility, the emissions model comprising a translation layer configured to:

translate parameters associated with the emissions model to the first data and the second data; and format the first data and the second data to have similar data structures that allow for spatial and temporal mapping of the first emissions source and the second emissions source;

increase an accuracy of the digital twin by enhancing the translation layer through an inclusion of a temporal nature of the first emissions data, neighboring equipment relative to the first emissions source, and historical operational trends of the first emissions source, wherein the neighboring equipment comprises the second emissions source;

optimize a prediction and classification capacity of the digital twin using an attribution quality in combination with a resolution of the digital twin to generate a spatial and temporal emissions mapping, the attribution quality comprising a property used to qualitatively and quantitatively characterize a level of confidence associated with correctly determining the first emissions event and associating the first emissions event with the first emissions source;

generate a space-time emissions map of the facility based on the spatial and temporal emissions mapping;

execute, based on the space-time emissions map of the facility, a first simulation using the emissions model to generate second emissions data associated with a second set of emissions sources of the facility comprised in the plurality of emissions sources of the facility;

close the first operation of the first emissions source in response to the first simulation;

feed impact information from the closing of the first operation to the emissions model to generate an improved emissions model; and execute a mitigation operation of the first emissions source in real time based on the improved emissions model.

19. The computing device of claim 18, wherein the one or more sensors comprise at least one of:

LiDAR emissions sensors;

camera emissions sensors;

sniffer sensors;

drone sensors; or satellite sensors.

* * * * *